United States Patent
Francis

(10) Patent No.: US 7,959,697 B2
(45) Date of Patent: Jun. 14, 2011

(54) AUGER SCREEN

(75) Inventor: Gary Lane Francis, Saskatchewan (CA)

(73) Assignee: REM Enterprises Inc. (CA)

( * ) Notice: Subject to any disclaimer, the term of this patent is extended or adjusted under 35 U.S.C. 154(b) by 742 days.

(21) Appl. No.: 11/799,121

(22) Filed: May 1, 2007

(65) Prior Publication Data

US 2008/0274777 A1 Nov. 6, 2008

(30) Foreign Application Priority Data

Apr. 23, 2007 (CA) .................................... 2585731

(51) Int. Cl.
*B65G 53/04* (2006.01)
(52) U.S. Cl. ............ 55/385.1; 406/38; 406/53; 406/55; 406/168
(58) Field of Classification Search ................. 55/385.1; 460/79, 97, 42, 44, 100, 102; 34/137, 182, 34/187, 235; 454/182; 99/474; 406/38, 406/51, 53, 168, 102, 55
See application file for complete search history.

(56) References Cited

U.S. PATENT DOCUMENTS

| | | | | |
|---|---|---|---|---|
| 3,450,138 A * | 6/1969 | Gunyou et al. | ................. | 460/43 |
| 3,491,765 A * | 1/1970 | Stott et al. | ....................... | 460/42 |
| 3,745,669 A * | 7/1973 | Meiners | .......................... | 34/187 |
| 4,194,859 A * | 3/1980 | Boon et al. | ..................... | 406/172 |
| 4,336,041 A * | 6/1982 | Jolin | ........................... | 55/341.1 |
| 4,877,039 A * | 10/1989 | Somerville et al. | ............ | 460/97 |
| 6,007,272 A * | 12/1999 | Macku et al. | .................. | 404/92 |
| 6,444,003 B1 * | 9/2002 | Sutcliffe | ...................... | 55/385.1 |
| 2004/0045123 A1 * | 3/2004 | Engel et al. | ..................... | 15/347 |
| 2004/0163567 A1 * | 8/2004 | Eldridge et al. | ............. | 104/17.1 |
| 2004/0211092 A1 * | 10/2004 | Barnes | ......................... | 37/142.5 |
| 2006/0046801 A1 * | 3/2006 | Argetsinger et al. | ........... | 460/59 |
| 2006/0123745 A1 * | 6/2006 | Pobihushchy | .................. | 55/354 |
| 2007/0163859 A1 * | 7/2007 | Noble et al. | ................... | 198/671 |
| 2007/0269276 A1 * | 11/2007 | Francis et al. | ..................... | 406/38 |
| 2008/0261671 A1 * | 10/2008 | Stukenholtz et al. | ......... | 460/114 |
| 2009/0035073 A1 * | 2/2009 | Rempel | ............................ | 406/53 |
| 2009/0252562 A1 * | 10/2009 | Rempel | ............................ | 406/51 |

* cited by examiner

*Primary Examiner* — Duane Smith
*Assistant Examiner* — Minh-Chau Pham
(74) *Attorney, Agent, or Firm* — Thompson Hine LLP

(57) ABSTRACT

A bulk loader including an air inlet, an air-particulates separating chamber in communication with the air inlet, an air outlet in communication with the air-particulates separating chamber, means for moving air and particulates into the air-particulates separating chamber, means for separating air from particulates positioned within the air-particulates separating chamber, means for removing air from the air-particulates separating chamber, an auger, the auger being in communication with the air-particulates separating chamber by way of an auger opening in the air-particulates separating chamber, and a screen positioned across a portion of the auger opening adapted to permit air to flow therethrough and adapted to prevent particulates from flowing therethrough.

9 Claims, 6 Drawing Sheets

AUGER SCREEN

This application claims priority to a Canadian Patent Application entitled AUGER SCREEN, filed on Apr. 23, 2007, in the name of Applicant REM Manufacturing Ltd., invented by Gary Lane Francis. The entire content of that application is hereby incorporated by reference.

FIELD OF THE INVENTION

The present invention relates to bulk loaders for grain, particulates and granular materials (hereinafter referred to as "particulates") which utilize a source of negative pressure to create a suction air stream that draws particulates into the bulk loader for removal by an auger or screw-type conveyor (hereinafter referred to as an "auger") to a location remote from the bulk loader and more particularly, the present invention relates to an auger screen for such bulk loaders.

DESCRIPTION OF THE ART

In the past, bulk loaders, using suction or negative pressure, move particulates through a suction/vacuum pickup conduit or pipe (hereinafter a "particulate vacuum hose") into an air-particulate separating chamber within the loader for subsequent removal of the particulates by an auger positioned within an auger conveyor tube (hereinafter "auger tube") to a location remote from the loader, these bulk loaders typically utilizing a fan or blower to create suction for the vacuum pickup of the particulate materials. Upon arrival in the air-particulate separating chamber within the loader, the particulate material is then moved, for example, by an auger positioned within the auger tube to a position remote from the loader, such as a grain bin or a grain cart or other container.

Dis-advantageously however, when particulate materials are fed into the particulate vacuum hose at an excessive rate, the particulate vacuum hose may become intermittently restricted or plugged. When this occurs, air may be drawn by way of the auger tube back into the loader's air-particulate separating chamber, and in the process, as the air travels through the auger tube, it may draw particulate material from the auger and auger tube back into the loader's air-particulate separating chamber, thereby filling or refilling the air-particulate separating chamber with particulates or preventing maximum loading of the auger, and restricting the output load capacity of the loader.

There is a need to prevent or reduce the amount of particulate material from being drawn back into the loader's air-particulate separating chamber when the particulate vacuum hose becomes intermittently restricted or plugged.

SUMMARY

Accordingly, one object of the present invention is to provide a device which when installed on a bulk loader, will prevent, reduce or limit the amount of particulate material which may be drawn back into the bulk loader's air-particulate separating chamber when the particulate vacuum hose becomes intermittently restricted or plugged.

According to one aspect of the present invention, there is provided a bulk loader comprising an air inlet, an air-particulates separating chamber in communication with the air inlet, an air outlet in communication with the air-particulates separating chamber, means for moving air and particulates into the air-particulates separating chamber, means for separating air from particulates positioned within the air-particulates separating chamber, means for removing air from the air-particulates separating chamber, an auger, the auger being in communication with the air-particulates separating chamber by way of an auger opening in the air-particulates separating chamber, and a screen positioned across a portion of the auger opening adapted to permit air to flow therethrough and adapted to prevent particulates from flowing therethrough.

The advantage of the present invention is that it provides a device which when installed on a bulk loader, will prevent, reduce or limit the amount of particulate material which may be drawn back into the bulk loader's air-particulate separating chamber when the particulate vacuum hose becomes intermittently restricted or plugged.

BRIEF DESCRIPTION OF THE DRAWINGS

A preferred embodiment of the present invention is described below with reference to the accompanying drawings, in which.

DETAILED DESCRIPTION

Figure 1:
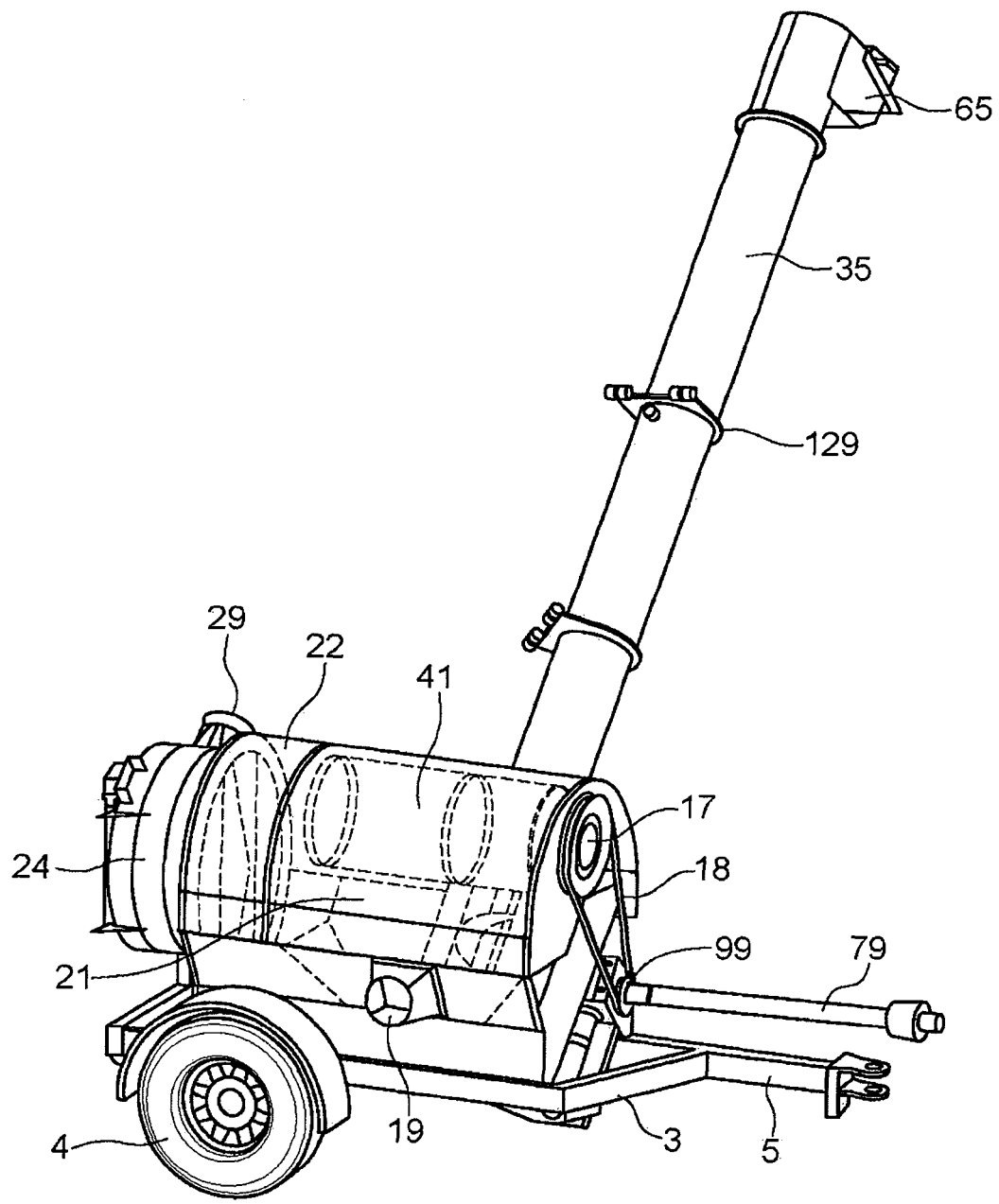
FIG. 1 is a view, partially in ghost form, of a bulk loader.
Figure 2:
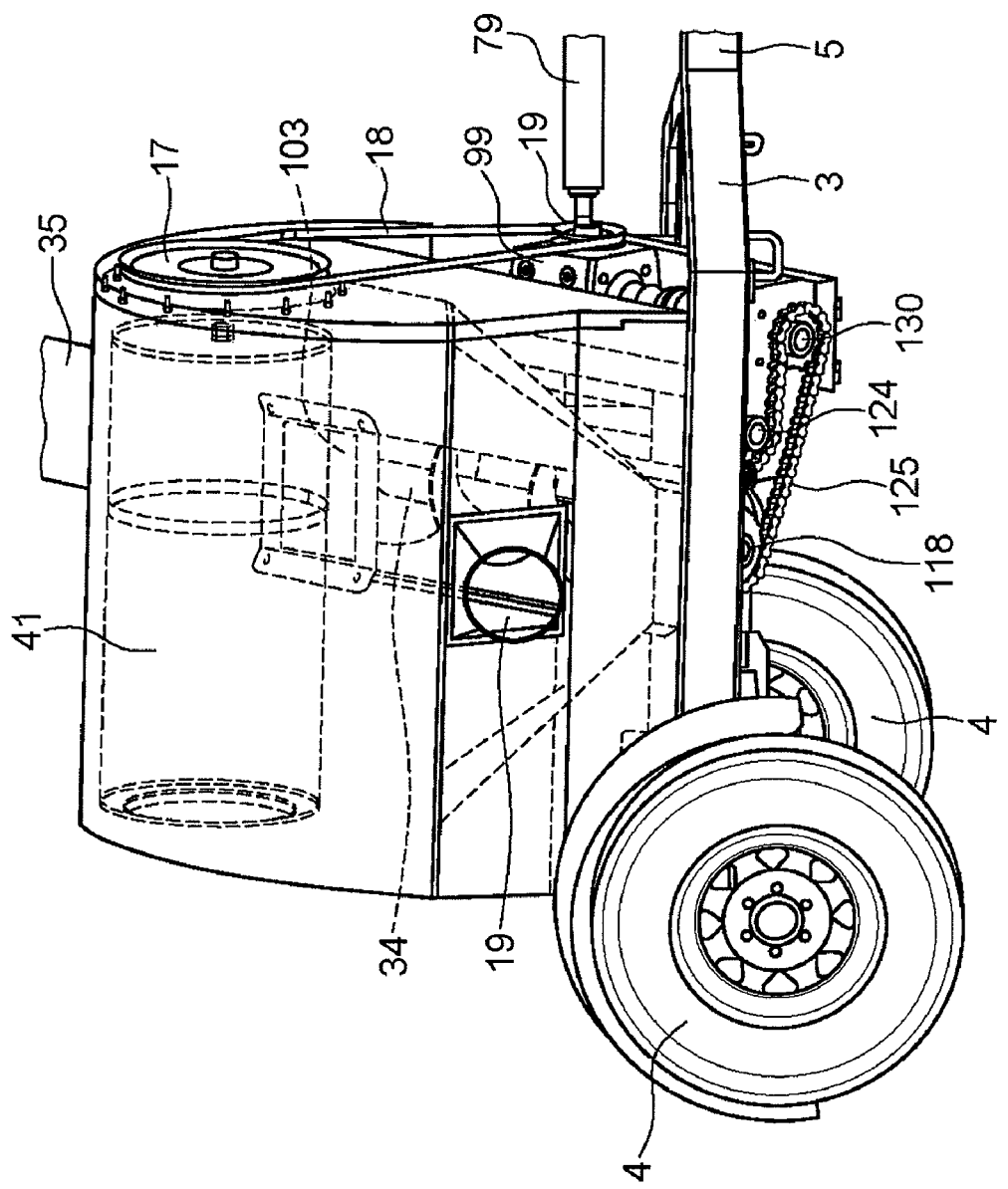
FIG. 2 is a view, partially in ghost form, of a portion of the bulk loader illustrated in FIG. 1.

With reference to FIGS. 1 and 2, a loader 1 is provided, having a chassis 3 which may have wheels 4 thereon, or not (the latter, for example, for stationary use). In the wheeled embodiment as illustrated in FIG. 1, the chassis has a forwardly extending tongue 5 to permit the loader 1 to be towed by a vehicle (not shown).

In the version of the loader illustrated in FIGS. 1 and 2, suction or vacuum is provided by one or more blowers (not shown) positioned within the blower housing 24, the blower or blowers drawing air and particulates by way of a hose (not shown) through inlet 19 into the air-particulates separating chamber 21, the air thereafter passes through small perforations within the generally cylindrical rotating drum 41 in the air-particulates separating chamber 21, and the air is thereafter exhausted through, in one embodiment of the present invention such as is illustrated in FIG. 1, a secondary air-particulates separation chamber 22, and thereafter to an air outlet 29 through which the air is expelled from the loader 1 by way of the blowers, the particulates being separated from the air stream after passage through the inlet 19 and remaining withing the air-particulates separating chamber 21 until such time as they are removed by the auger 34.

At or near the bottom of the air-particulates separating chamber 21, an auger opening 101 is provided, to provide access or a passageway between the air-particulates separating chamber 21 and the auger 34, the auger 34 extending preferably generally upwardly and away from the air-particulates separating chamber 21 through an elongated tubular housing 35, up to and through an end dump 65 or other similar device through which the particulates pass before falling into a pile or container or vehicle as desired by the user.

During operation, the auger may be, for example, mechanically driven, for example, by one or more drive shafts 78 and 79 (for example, through an appropriate power transfer case 99) and/or chain 125 by means of sprockets 118 and 130 (and where appropriate, one or more tensioning sprockets 124) or other power transfer mechanisms known to a person skilled in the art, the rotating auger lifting the particulates from the air-particulates separating chamber 21, through the elongated tubular housing 35, up to and through an end dump 65 or other similar device through which the particulates pass before falling into a pile or container or vehicle as desired by the user.

The blowers (not shown) positioned within the blower housing 24, the rotating drum 41, and the auger 34 may be driven, for example, by means of a main driveshaft 79 attached, for example, to one end of the power take off of a tractor, or other rotary power device, and on the other end to one or more appropriate power-transfer cases 99, and such other chains (for example 125), belts (for example 18) and/or drive shafts (for example 81) as would be known to a person skilled in the art.

Figure 3:
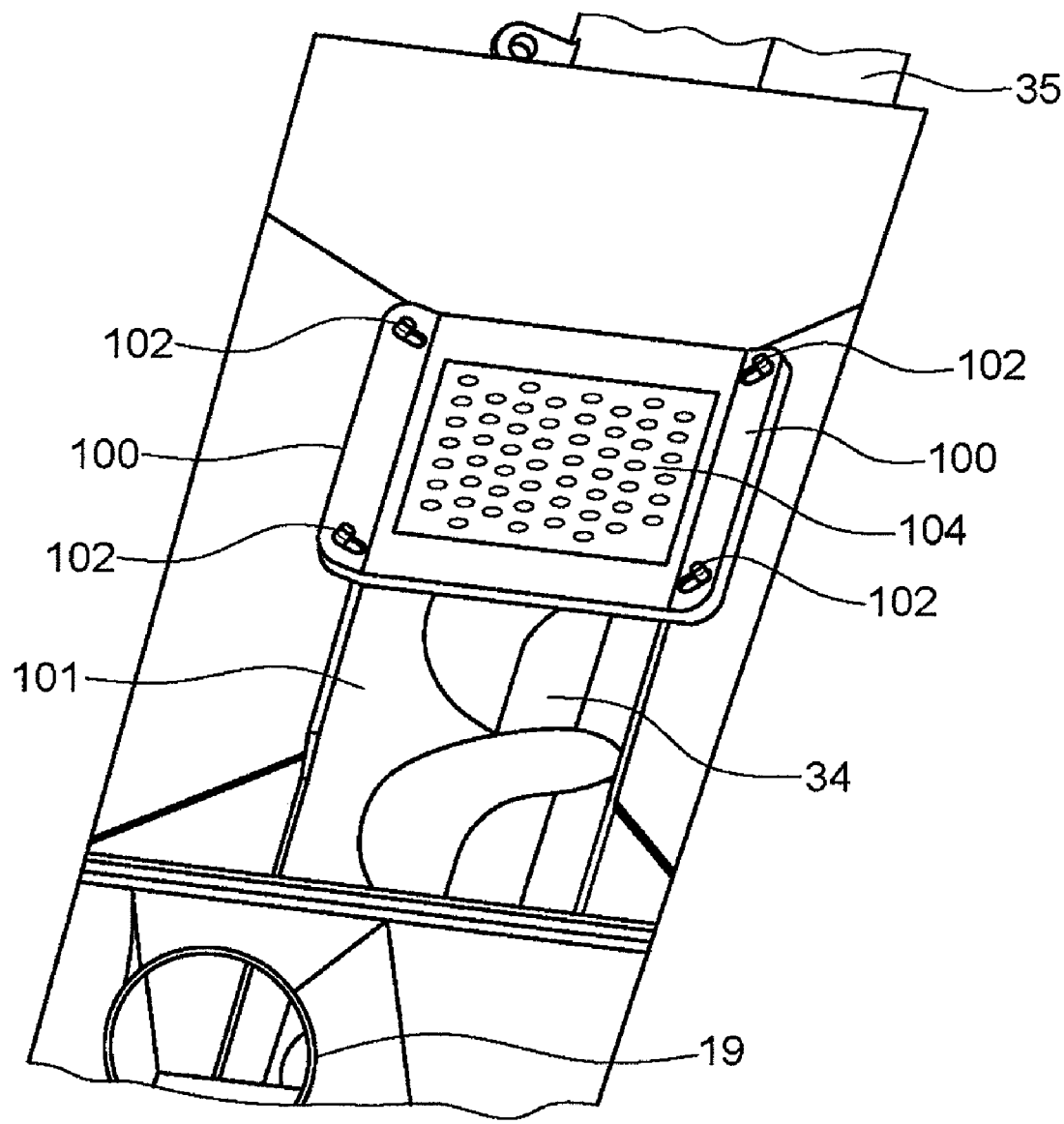
FIG. 3 is a view of the auger screen assembly and screen element of one embodiment of the present invention positioned across a portion of the auger opening.
Figure 4A:
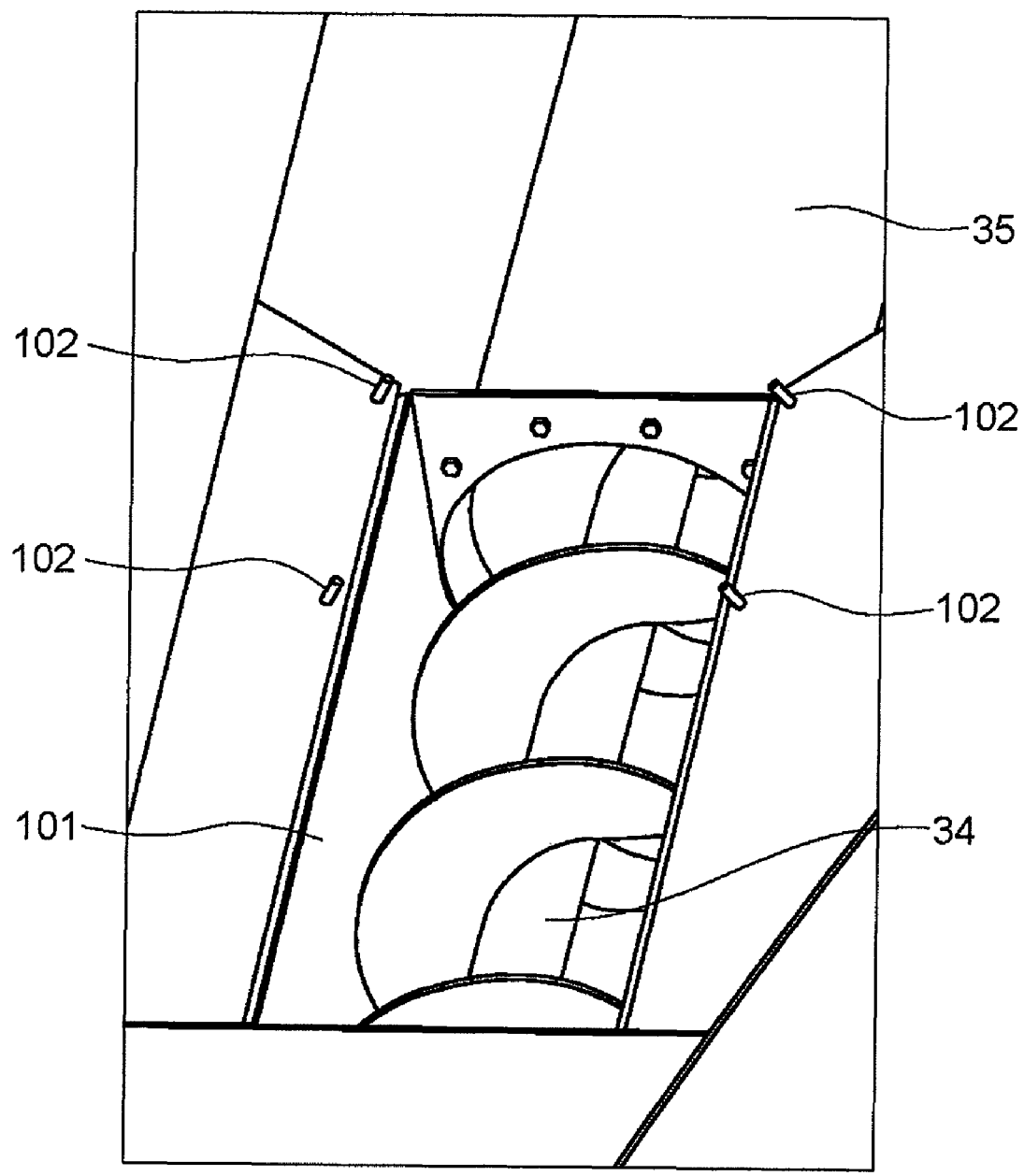
FIG. 4A is a view of an auger opening of a bulk loader.
Figure 4B:
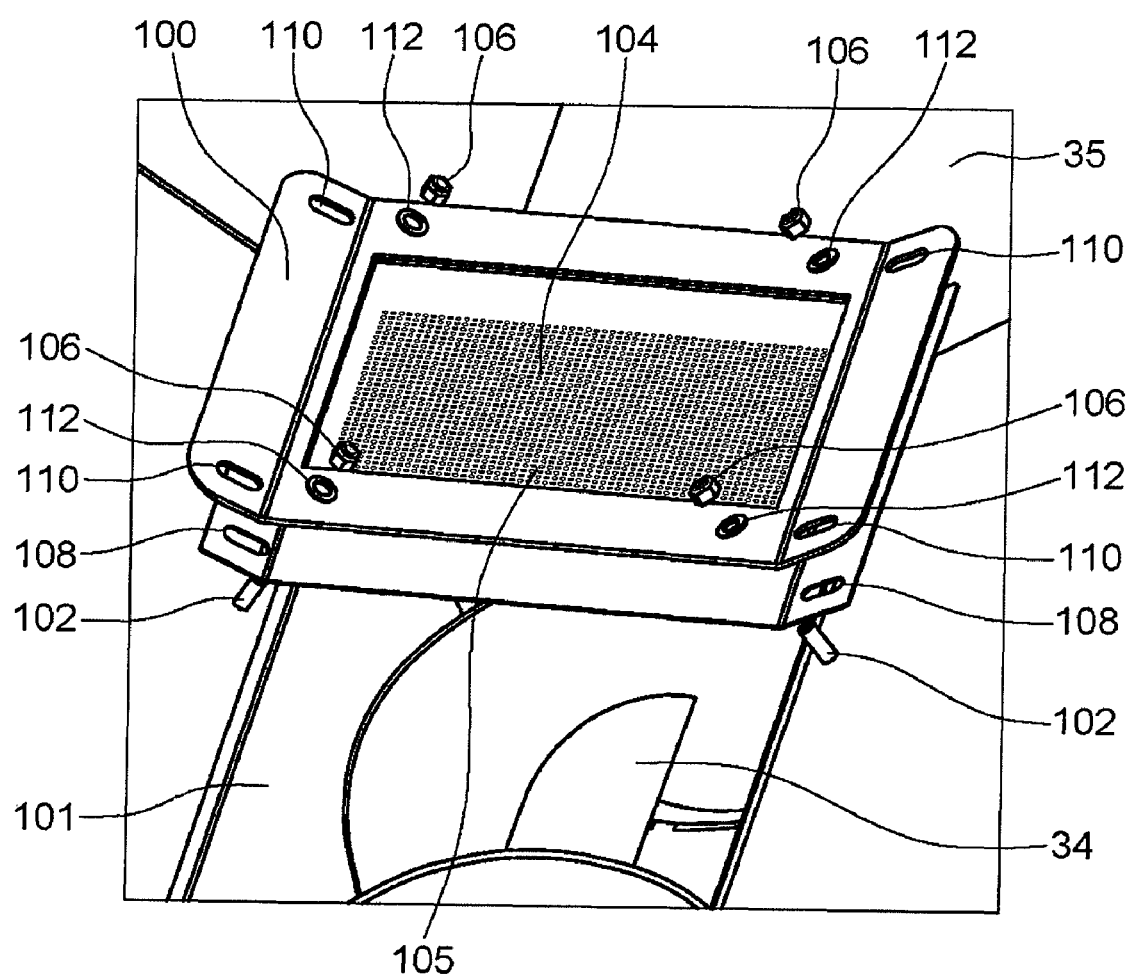
FIG. 4B is an exploded view of the auger screen assembly of one embodiment of the present invention positioned across a portion of the auger opening.
Figure 5:
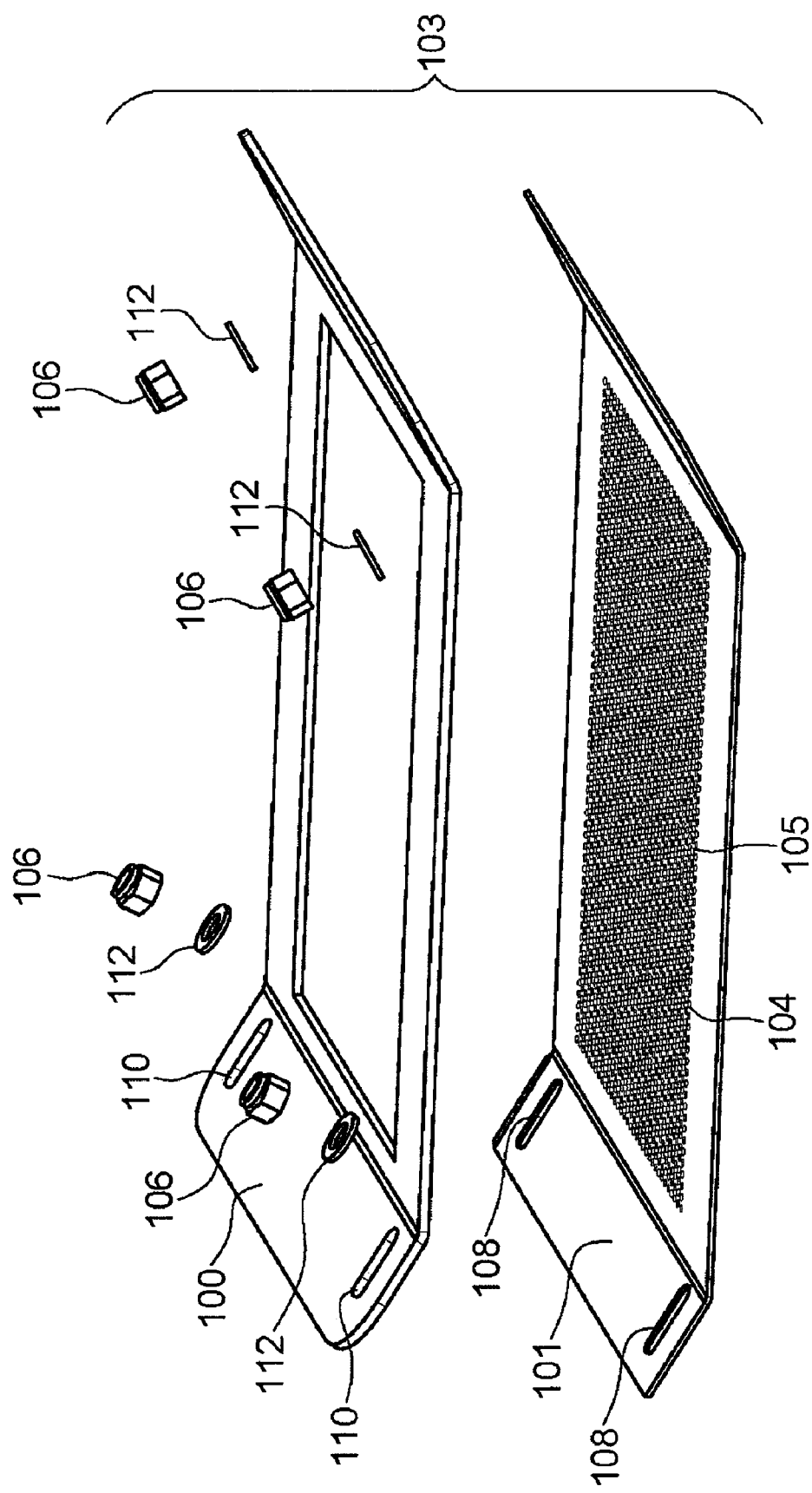
FIG. 5 is an exploded view of the auger screen assembly of one embodiment of the present invention.

In the preferred embodiment of the present invention, an auger screen assembly 103, such as the one illustrated in FIGS. 3, 4B and 5, is positioned and securely engaged in a manner more fully described herein, across a portion of the auger opening 101, preferably at or near that end of the auger opening 101 nearest to the end dump 65 or other opening in the auger tube remote from the air-particulate separation chamber. As illustrated in FIG. 4A, the auger screen assembly can be readily removed and the loader operated without the auger screen assembly.

In the preferred embodiment of the present invention, the auger screen assembly 103 preferably has a screen element 104 made of 12 gauge mild steel, or other suitable material, it being understood that alternative materials may be utilized as would be known to a person skilled in the art. In the preferred embodiment, an array 105 of a large number of (for example, between 100 and 1000) 1/8 inch diameter circular holes, with 3/16 inch center to center distance therebetween is provided in the screen element 104, it being understood that the size and shape of the array 105 of holes and the size and shape and number of the holes may be varied according to the size and characteristics of the particulates to be passing through the bulk loader and such other factors as would be known to person skilled in the art. For example, in one embodiment of the present invention, slotted (i.e. oval-shaped or non-round) holes may be utilized in place of the above-described circular holes, the hole size and relative distance between the holes being varied as needed, for example, relatively narrow slotted and closely spaced holes may be used for smaller and drier particulates, and whereas wider, less closely spaced holes may be used for larger or wetter particulates). In a further alternative embodiment, wire mesh screen or finally spaced louvers may be used in place of the above-described circular or slotted holes.

In the preferred embodiment, the screen element 104 has four holes 108 therein through which, during the installation of the screen element 104 onto the bulk loader, the threaded studs 102 or threaded rods may pass, the threaded studs 102 or threaded rods being welded or otherwise securely fastened to the surface of the air-particulates separating chamber 21. In the preferred embodiment, as illustrated in FIGS. 4B and 5, a support frame 100 is provided, preferably made of 12 gauge steel (or other suitable material, it being understood that alternative materials may be utilized as would be known to a person skilled in the art), and having holes 110 substantially corresponding in location to the four holes 108 of the screen element 104, is installed on top of and securely engaged with the screen element 104, the threaded studs 102 or threaded rods passing through the holes 110, and thereafter, the washers 112 and nuts being positioned on the threaded studs 102 or threaded rods, the nuts thereafter being tightened to securely engage the support frame 100 and the screen element 104 to the surface of the air-particulates separating chamber 21, across a portion of the auger opening 101. It is understood that a wide range of alternative methods may be used to securely and temporarily (or permanently) engage and support the screen element 104 in an appropriate position across a portion of the auger opening 101 as would be known to a person skilled in the art.

In an alternative embodiment of the present invention, the screen element 104 is made of heavier gauge or stronger material than the 12 gauge steel of the preferred embodiment, and in this alternative embodiment, the screen element 104 is positioned upon and securely fastened to the surface of the air-particulates separating chamber 21 across a portion of the auger opening 101 without the support frame 100, the screen element 104 in this embodiment has four holes 108 therein through which, during the installation of the screen element 104, the threaded studs 102 or threaded rods may pass, the threaded studs 102 or threaded rods being welded or otherwise securely fastened to the surface of the air-particulates separating chamber 21. Thereafter, the washers 112 and nuts are positioned on the threaded studs 102 or threaded rods, the nuts thereafter being tightened to securely engage the screen element 104 to the surface of the air-particulates separating chamber 21, across a portion of the auger opening 101.

It is understood that the present invention described herein may be used, with appropriate modifications as would be understood by a person skilled in the art, on a wide variety of bulk loaders which vary from the ones illustrated in FIGS. 1 and 2 herein.

The present invention has been described herein with regard to preferred embodiments.

However, it will be obvious to persons skilled in the art that a number of variations and modifications can be made without departing from the scope of the invention as described herein.

What is claimed is:

1. A bulk loader comprising:
   a) a suction mechanism in communication with an air-particulates separating chamber for providing suction thereto, the suction for moving air and particulates into the air-particulates separating chamber;
   b) a separating mechanism disposed in the air-particulates separating chamber for separating the air from the particulates;
   c) an auger for conveying the particulates to a remote location from the air-particulates separating chamber, the auger being in communication with the air-particulates separating chamber by way of an auger opening in the air-particulates separating chamber; and,
   d) a screen positioned across a portion of the auger opening adapted to permit air to flow therethrough and adapted to prevent particulates disposed in the auger from being drawn therethrough back into the air-particulates separating chamber, wherein the screen is positioned across only a portion and not the whole portion of the auger opening.

2. A bulk loader as defined in claim 1 wherein the auger is placed in an auger tube and wherein the screen is positioned near an end of the auger opening nearest to an opening in the auger tube remote from the air-particulate separation chamber.

3. A bulk loader as defined in claim 1 wherein the screen is removably mounted to a surface of the air-particulates separating chamber.

4. A bulk loader as defined in claim 1 wherein the screen comprises a screen element mounted to a surface of the air-particulates separating chamber.

5. A bulk loader as defined in claim 1 wherein the screen comprises a screen element and a support frame mounted to a surface of the air-particulates separating chamber.

6. A bulk loader as defined in claim 1 wherein the screen comprises a predetermined array of openings with the opening having a predetermined shape and size.

7. A bulk loader as defined in claim 6 wherein the openings have a circular shape.

8. A bulk loader as defined in claim 6 wherein the openings have an elongated shape.

9. A bulk loader as defined in claim 6 wherein the screen comprises a wire mesh.

* * * * *